United States Patent
Yang et al.

(10) Patent No.: US 7,697,788 B2
(45) Date of Patent: Apr. 13, 2010

(54) SYSTEM AND METHOD FOR AUTOMATICALLY IDENTIFYING A GEOMETRICAL ELEMENT IN AN IMAGE

(75) Inventors: Hua-Wei Yang, Guangdong (CN); Chih-Kuang Chang, Guangdong (CN)

(73) Assignees: Hong Fu Jin Precision Industry (Shen Zhen) Co., Ltd., Longhua Town, Bao'an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 999 days.

(21) Appl. No.: 11/164,780

(22) Filed: Dec. 6, 2005

(65) Prior Publication Data

US 2006/0197991 A1 Sep. 7, 2006

(30) Foreign Application Priority Data

Dec. 24, 2004 (TW) ............................. 93140427 A

(51) Int. Cl.
*H04N 1/60* (2006.01)
*G06F 15/00* (2006.01)

(52) U.S. Cl. ................. 382/295; 358/1.9; 358/3.15; 358/474

(58) Field of Classification Search ................. 382/295; 358/3.15, 474, 1.9, 1.009
See application file for complete search history.

(56) References Cited

U.S. PATENT DOCUMENTS 4,644,583 A * 2/1987 Watanabe et al. ............ 382/199
5,047,868 A * 9/1991 Takeda et al. ............... 386/109
5,339,367 A * 8/1994 Roth ........................... 382/199

(Continued)

FOREIGN PATENT DOCUMENTS

JP 2004-163313 6/2004

OTHER PUBLICATIONS

David B. Cooper and Nese Yalabik, "On the Computational Cost of Approximating and Recognizing Noise-Perturbed Straight Lines and Quadratic Arcs in the Plane," IEEE Transactions on Computers, vol. C-25, No. 10, Oct. 1976, pp. 1020-1032.*
Vaughn Pratt, "Direct Least-Squares Fitting of Algebraic Surfaces" ACM Computer Graphics, vol. 21, No. 4, Jul. 1987; ACM-0-89791-227-6/87/007/0145, pp. 145-152.*

*Primary Examiner*—Bhavesh M Mehta
*Assistant Examiner*—Stephen R Koziol
(74) *Attorney, Agent, or Firm*—Winston Hsu

(57) ABSTRACT

An identifying system is provided for identifying a geometrical element in an image automatically. The image may be retrieved from an image capturing apparatus and is imported in a coordinate system. The identifying system includes: a collecting module for collecting dots from the image as a dot muster and retrieving coordinates of all dots of the dot muster from the coordinate system; a curve fitting and geometrical element identifying module for curve fitting according to the coordinates of all the dots of the dot muster to identify what geometrical element the dot muster is; a storing module for storing the coordinates of all the dots of the dot muster, data produced during the curve fitting process, and result data of curve fitting and geometrical element identifying; and an outputting module for outputting the result data. A related identifying method is also provided.

13 Claims, 5 Drawing Sheets

U.S. PATENT DOCUMENTS 5,544,265 A * 8/1996 Bozinovic et al. ............ 382/203
5,572,605 A * 11/1996 Toraichi ..................... 382/241
5,870,495 A * 2/1999 Mancuso et al. ............ 382/199
6,219,462 B1 4/2001 Anandan et al.

* cited by examiner

SYSTEM AND METHOD FOR AUTOMATICALLY IDENTIFYING A GEOMETRICAL ELEMENT IN AN IMAGE

FIELD OF THE INVENTION

The present invention is generally related to systems and methods for image measuring and processing, and, more particularly to a system and method for curve fitting and identifying a geometrical element in an image.

DESCRIPTION OF RELATED ART

A typical image measuring tool captures an image from an object to be measured, and then analyzes and processes the image to output exact and precise data on the object. Such data typically concern about geometrical element identification. When measuring an analogous circle object, a measuring person can select a circle identifying function of the image measuring tool, while measuring an analogous linear object, the measuring person can select a line identifying function of the image measuring tool. That is, the measuring person have to switch different functions respectively for objects of different geometrical shapes.

However, it would take too much time to switch functions when a large amount of objects of different geometrical shapes are to be measured.

Accordingly, what is needed is a solution that can save the time consuming in switching functions when processing different geometrically-shaped objects.

SUMMARY OF INVENTION

Embodiments of the present invention provide systems for identifying a geometrical element in an image automatically, which does not need switch functions when processing different geometrically-shaped objects.

Embodiments of the present invention provide methods for automatically identifying a geometrical element in an image, which does not need switch functions when processing different geometrically-shaped objects.

Briefly described, one embodiment of such a system among others, can be implemented as described herein. An identifying system automatically identifies a geometrical element in an image. The image may be retrieved from an image capturing apparatus and is imported in a coordinate system. The identifying system includes: a collecting module for collecting dots from the image as a dot muster and retrieving coordinates of all dots of the dot muster from the coordinate system; a curve fitting and geometrical element identifying module for curve fitting according to the coordinates of all the dots of the dot muster to identify what geometrical element the dot muster is; a storing module for storing the coordinates of all the dots of the dot muster, data produced during the curve fitting process, and result data of curve fitting and geometrical element identifying; and an outputting module for outputting the result data.

One embodiment of such a method among others can be implemented as described herein. A method can be performed to identify a geometrical element in an image automatically. The image may be retrieved from an image capturing apparatus and is imported in a coordinate system. The method includes the steps of: collecting dots from the image as a dot muster and retrieving coordinates of all dots of the dot muster from the coordinate system; identifying that the dot muster is a dot, when only one dot is included in the dot muster; identifying that the dot muster is a line, when two dots are included in the dot muster; calculating a line-offset and a circle-offset respectively for the dot muster according to the coordinates of all the dots of the dot muster, when three dots or more are included in the dot muster; identifying that the dot muster is a line, when the circle-offset is greater than or equal the line-offset; and identifying that the dot muster is a circle, when the circle-offset is less than the line-offset.

Other systems, methods, features, and advantages of the present invention will be or become apparent to one with skill in the art upon examination of the following drawings and detailed description.

DETAILED DESCRIPTION

Figure 1:
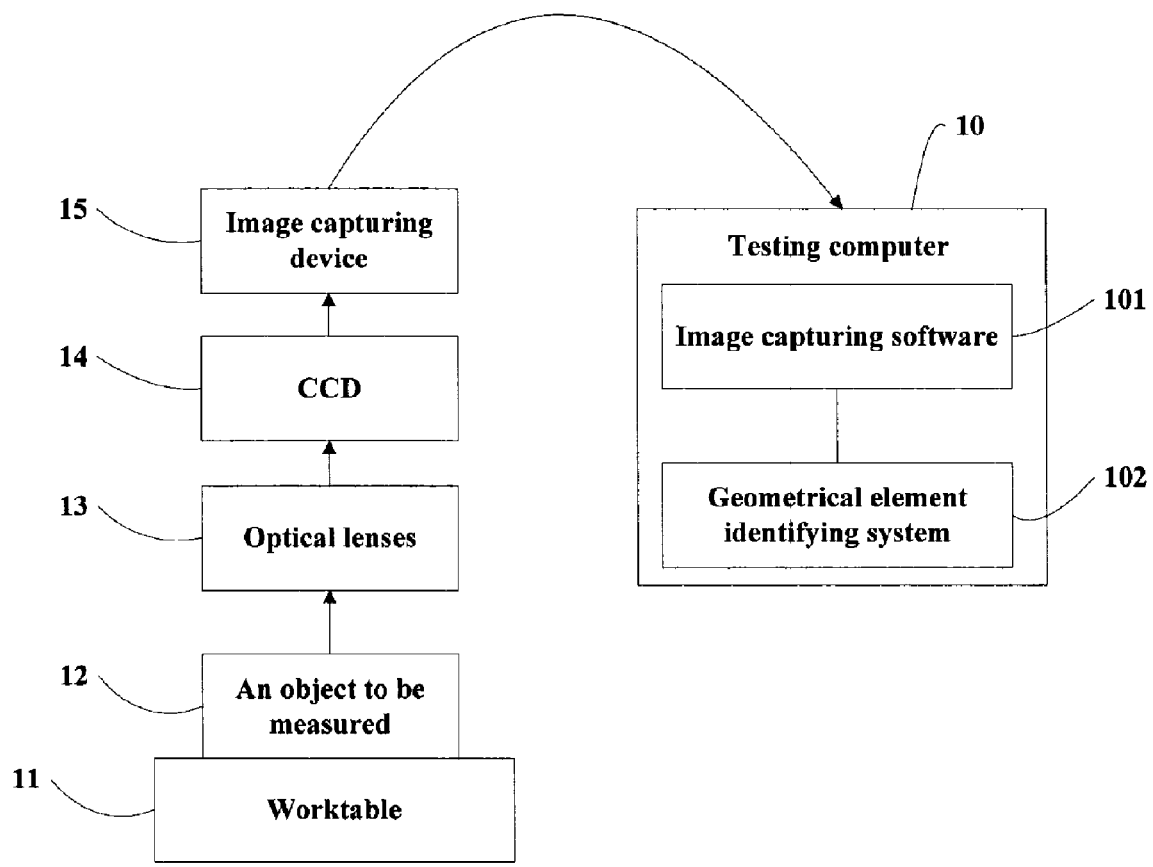
FIG. 1 is a schematic diagram illustrating a hardware environment which implements a system for automatically identifying a geometrical element in an image, in accordance with one embodiment of the present invention.

FIG. 1 is a schematic diagram illustrating a hardware environment which implements a system for automatically identifying a geometrical element in an image, in accordance with one embodiment of the present invention. An object 12 lies on a worktable 11, and is ready to be measured. A group of optical lenses 13 are equipped above the object 12. A Charge Coupled Device (CCD) 14 is located above the group of optical lenses 13. The CCD 14 receives optical signals emitted from the object 12 through the group of optical lenses 13, transforms the optical signals into electrical signals, and transfers the electrical signals to an image capturing device 15. The image capturing device 15 receives the electrical signals from the CCD 14. An image capturing device 15 is very commonly used in measuring, and can be commercially accessible from many corresponding manufacturers.

A testing computer 10 is connected with the image capturing device 15, so that the digital signals can be transferred into the testing computer 10. The testing computer 10 can be a personal computer (PC), which may include a plurality of hardware devices, such as a central processing unit (CPU), a memory, a hard-disk, a monitor, a mouse and a key board. The testing computer 10 may also be installed with some software, such as an operating system (OS) and application software, such as image capturing software 101. The image capturing software 101 is usually provided accompanying the image capturing device 15 by a corresponding manufacturer. The image capturing software 101 and the image capturing device 15 collectively from an image capturing apparatus. The image capturing software 101 captures the electrical signals from the image capturing device 15, transforms the electrical signals into digital signals which are readable for the testing computer 10, and imports the digital signals into a coordinate system, such as a two dimensional coordinate system or a three dimensional coordinate system. The digital signals are entirely viewed and processed as an image of the object 12.

The testing computer 10 further implements a geometrical element identifying system 102. The geometrical element identifying system 102 can retrieve the image from the image capturing software 101, and identify a geometrical element in the image. Further description of the geometrical element identifying system 102 will be provided below in relation to FIG. 2.

Figure 2:
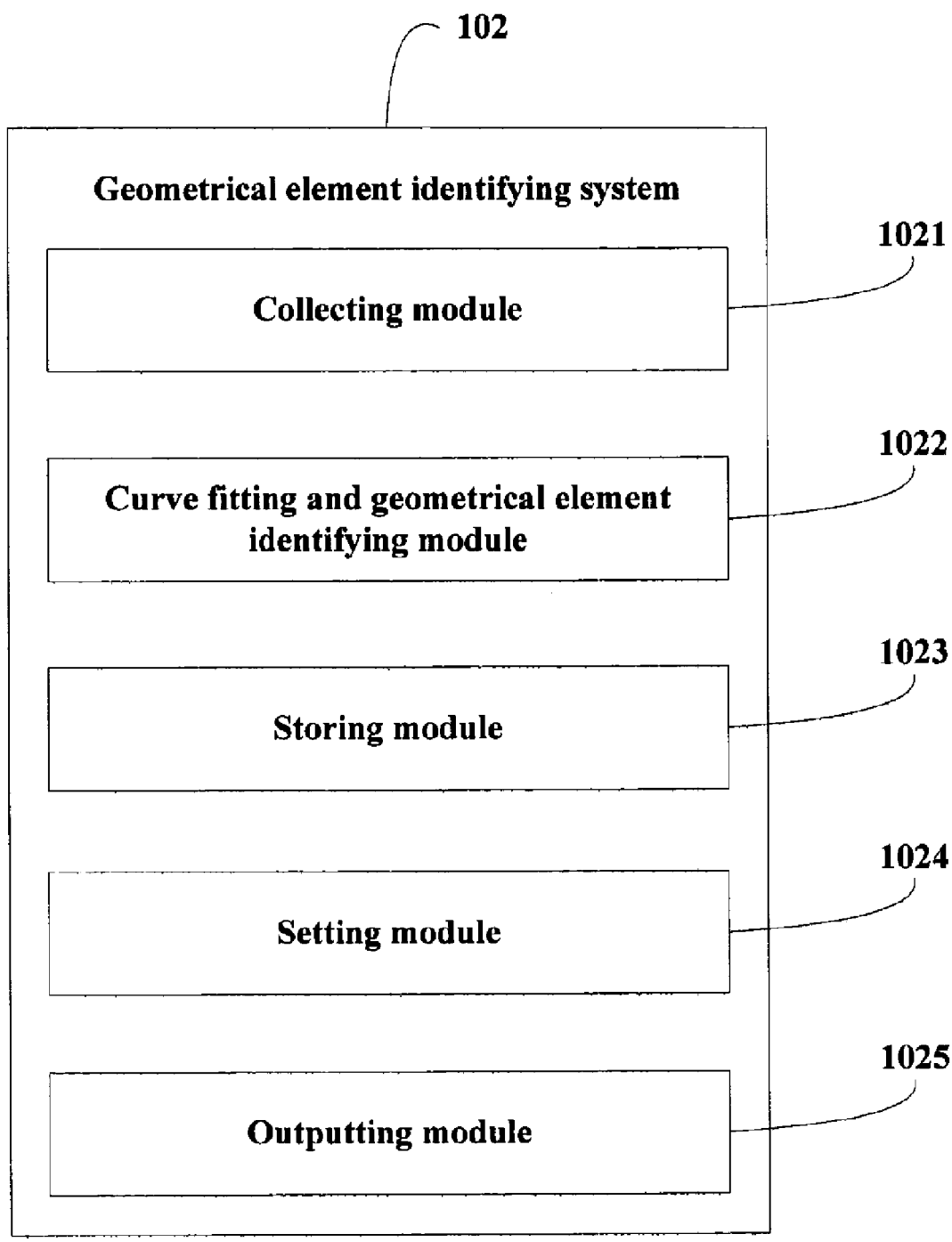
FIG. 2 is a schematic diagram illustrating function modules of the geometrical element identifying system of FIG. 1, in accordance with one embodiment of the present invention.

FIG. 2 is a schematic diagram illustrating function modules of the geometrical element identifying system 102 of FIG. 1, in accordance with one embodiment of the present invention. The geometrical element identifying system 102 includes a collecting module 1021, a curve fitting and geometrical element identifying module 1022, a storing module 1023, a setting module 1024 and a outputting module 1025.

The collecting module 1021 is used for collecting dots from the image as a dot muster and retrieving coordinates of all dots of the dot muster from the coordinate system mentioned above.

The curve fitting and geometrical element identifying module 1022 is used for curve fitting according to the coordinates of all the dots of the dot muster to identify what geometrical element the dot muster is.

The storing module 1023 is used for storing the coordinates of all the dots of the dot muster, data produced during the curve fitting process, and result data of curve fitting and geometrical element identifying. The setting module 1024 is used for customizing a style in which the result data is outputted, and chosen to partially or completely output the result data. The outputting module 1025 is used for outputting the result data of curve fitting and geometrical element identifying.

All the modules described above works together to implement a method for identifying a geometrical element in an image.

Figure 3:
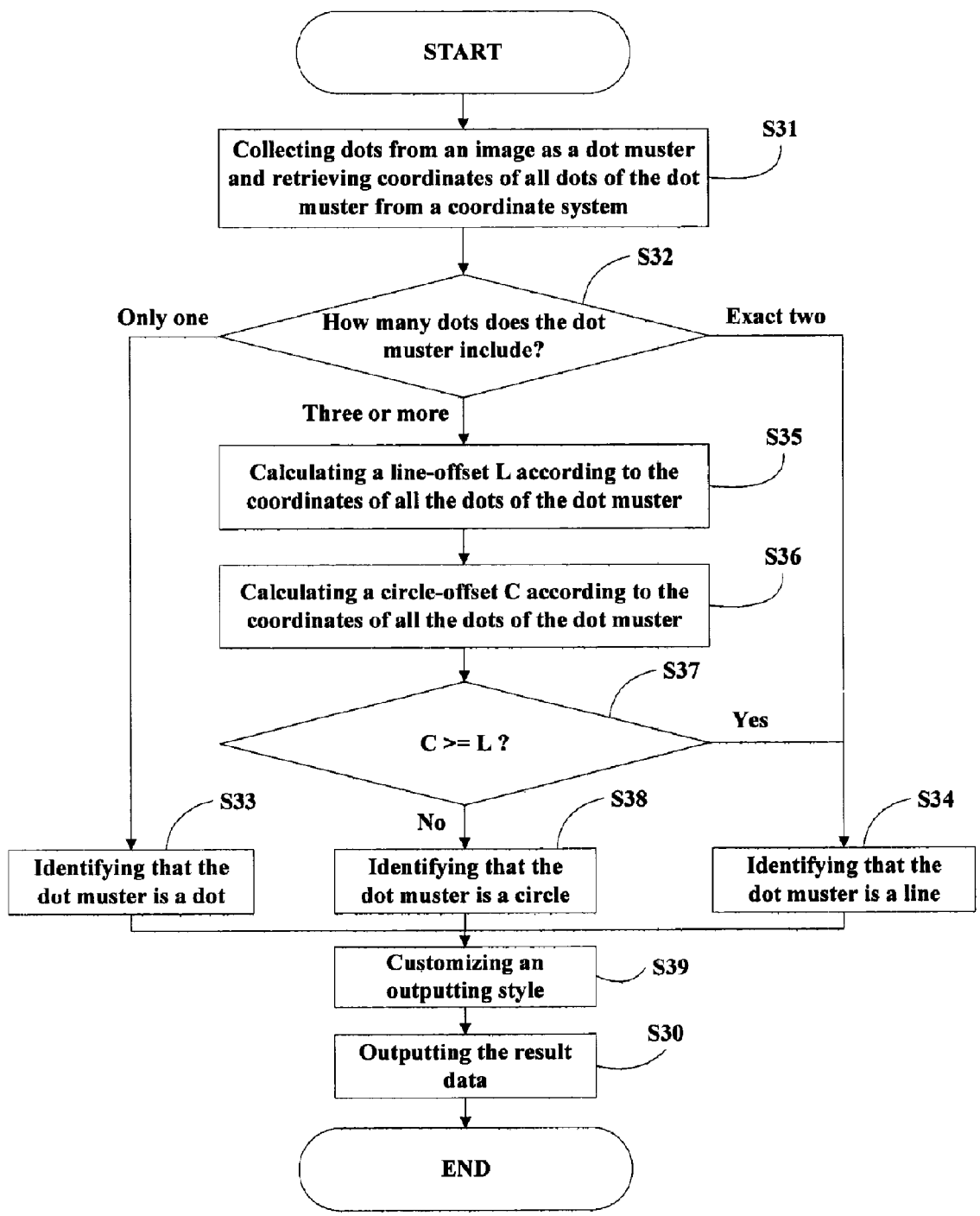
FIG. 3 is a flowchart illustrating a method for identifying a geometrical element in an image automatically, in accordance with one embodiment of the present invention.

FIG. 3 is a flowchart illustrating a method for identifying a geometrical element in an image automatically, in accordance with one embodiment of the present invention. In step 531, the collecting module 1021 collects dots from an image as a dot muster and retrieves coordinates of all dots of the dot muster from a coordinate system, such as a two dimensional coordinate system or a three dimensional coordinate system.

In step S32, the curve fitting and geometrical element identifying module 1022 determines how many dots the dot muster includes. If only one dot is included in the dot muster, in step S33, the curve fitting and geometrical element identifying module 1022 identifies that the dot muster is a dot, the storing module 1023 stores corresponding result data of identifying. If two dots are included in the dot muster, in step S34, the curve fitting and geometrical element identifying module 1022 identifies that the dot muster is a line, and the storing module 1023 stores corresponding result data of identifying.

If three dots or more are included in the dot muster, the curve fitting and geometrical element identifying module 1022 calculates a line-offset L and a circle-offset C for the dot muster according to the coordinates of all the dots of the dot muster, respectively in step S35 and S36. Further description about how the line-offset and the circle-offset are calculated will be provided below in relation to FIG. 4 and FIG. 5 respectively.

In step S37, the curve fitting and geometrical element identifying module 1022 compares the line-offset L with the circle-offset C. If the circle-offset C is greater than or equal the line-offset L, in step S34 described above, the curve fitting and geometrical element identifying module 1022 identifies that the dot muster is a line. If the circle-offset C is less than the line-offset L, in step S38, the curve fitting and geometrical element identifying module 1022 identifies that the dot muster is a circle.

In an alternative embodiment, if the circle-offset C is greater than the line-offset L, in step S34 described above, the curve fitting and geometrical element identifying module 1022 identifies that the dot muster is a line. If the circle-offset C is less than or equal the line-offset L, in step S38 described above, the curve fitting and geometrical element identifying module 1022 identifies that the dot muster is a circle.

In step S39, the setting module 1024 provide a user graphic interface for a user to customize a style in which the result data is outputted, and to choose to partially or completely output the result data. In step S30, the outputting module 1025 outputs the corresponding result data generated in step S33, S34 and S38 described above.

Figure 4:
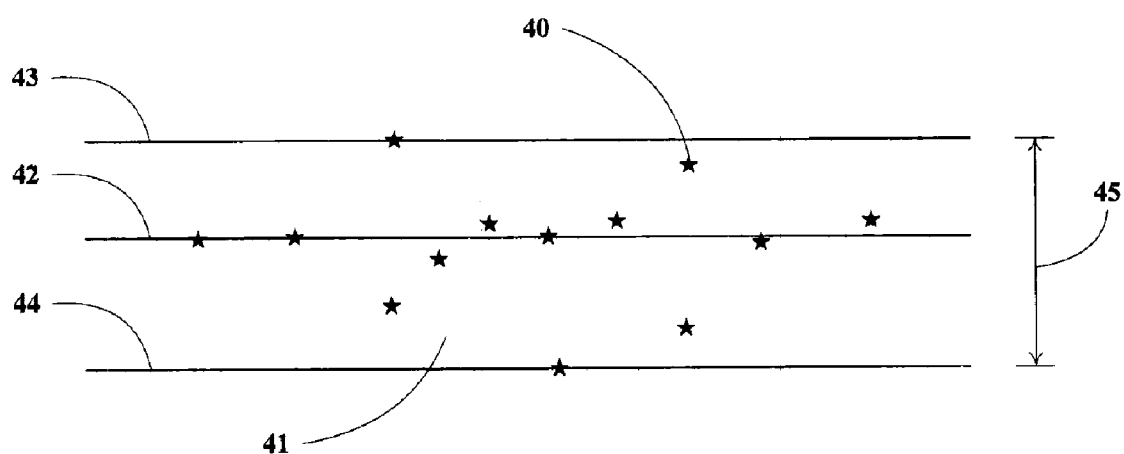
FIG. 4 is a schematic diagram illustrating how a line-offset is calculated, in accordance with one embodiment of the present invention.

FIG. 4 is a schematic diagram illustrating how a line-offset is calculated in step S35 described above. Many dots 40 in an image is viewed and processed as a dot muster 41. By using a Least Square Method also called the Criteria of Least Square, the curve fitting and geometrical element identifying module 1022 fits the dot muster 41 for a fitted line 42, a top borderline 43 and a bottom borderline 44 according to the coordinates of all the dots 40 of the dot muster 41. The fitted line 42 covers most dots 40 of the dot muster 41. The top borderline 43 covers the dot 40 at the top of the dot muster 41, and the bottom borderline 44 covers the dot 40 at the bottom of the dot muster 41. The fitted line 42, the top borderline 43 and the bottom borderline 44 are parallel to each other.

After fitting the lines mentioned above, the curve fitting and geometrical element identifying module 1022 calculates a span length 45 between the top borderline and the bottom borderline as the line-offset.

Figure 5:
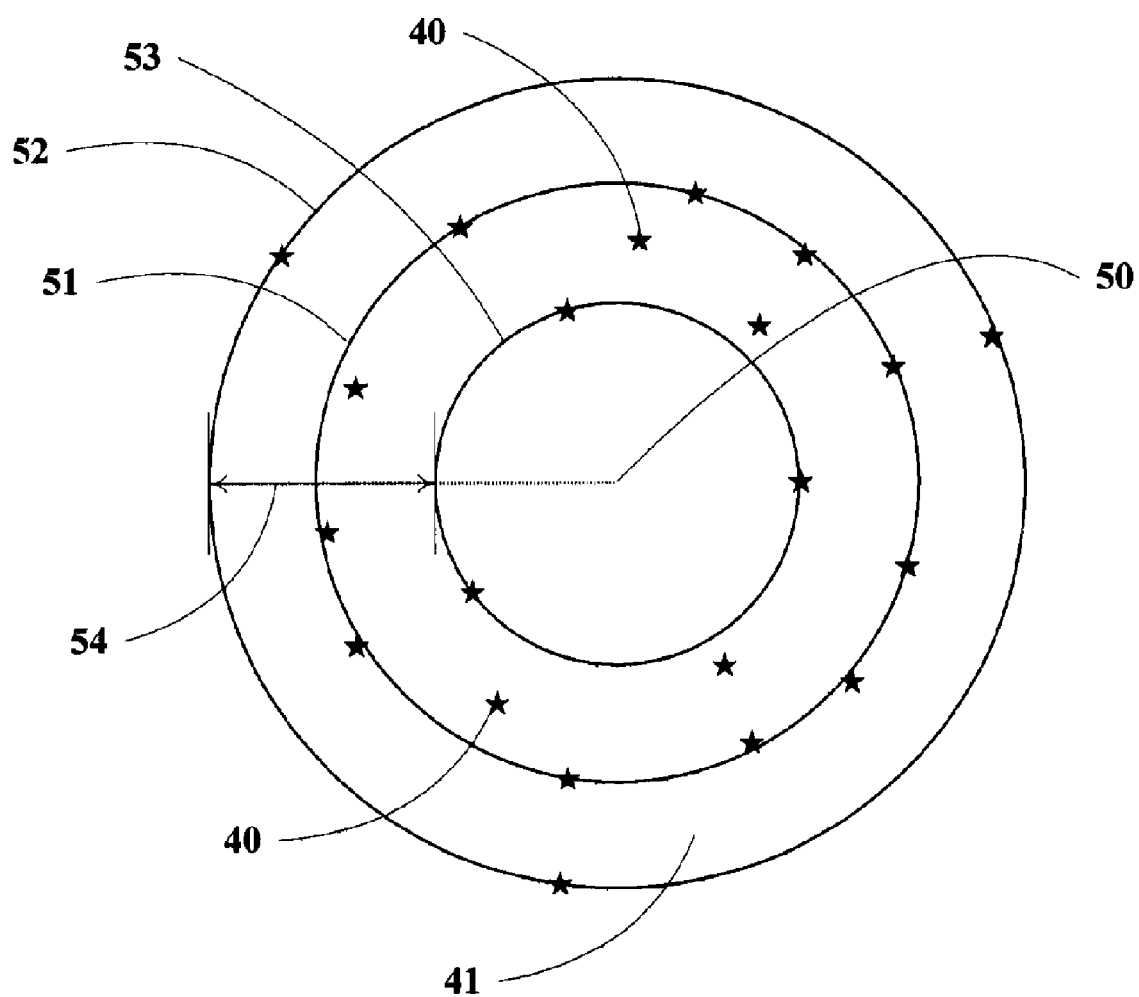
FIG. 5 is a schematic diagram illustrating how a circle-offset is calculated, in accordance with one embodiment of the present invention.

FIG. 5 is a schematic diagram illustrating how a circle-offset is calculated in step S36 describe above, in accordance with one embodiment of the present invention. The dot muster 41 includes a lot of dots 40 in the image. By using a Least Square Method also called the Criteria of Least Square, the curve fitting and geometrical element identifying module 1022 fits the dot muster 41 for a fitted circle 51, an outer border circle 52 and an inner border circle 53 according to the coordinates of all the dots 40 of the dot muster 41. The fitted circle 51 covers most dots 40 of the dot muster 41. The outer border circle 52 covers the dot 40 at the outer border of the dot muster 41, and the inner border circle 53 covers the dot 40 at the inner border of the dot muster 41. The fitted circle 51, the outer border circle 52 and the inner border circle 53 are concentric.

After fitting the circle mentioned above, the curve fitting and geometrical element identifying module 1022 calculates a span length 45 between the outer border circle 52 and the inner border circle 53 as the circle-offset.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. An identifying system for automatically identifying a geometrical element in an image, the image being retrieved from an image capturing apparatus and located in a coordinate system, the identifying system comprising:

a collecting module for collecting dots from the image as a dot muster and retrieving coordinates of all dots of the dot muster from the coordinate system;

a curve fitting and geometrical element identifying module for calculating a line-offset and a circle-offset according to the coordinates of all the dots of the dot muster when three dots or more are included in the dot muster, identifying that the dot muster is a line when the circle-offset is greater than or equal to the line-offset, and identifying that the dot muster is a circle when the circle-offset is less than the line-offset;

a storing module for storing the coordinates of all the dots of the dot muster, data produced during the curve fitting process, and result data of curve fitting and geometrical element identifying;

a setting module for customizing a style in which the result data is outputted, and choosing to partially or completely output the result data; and an outputting module for outputting the result data.

2. The identifying system according to claim 1, wherein the curve fitting and geometrical element identifying module:

identifies that the dot muster is a dot, when only one dot is included in the dot muster; and identifies that the dot muster is a line, when two dots are included in the dot muster.

3. The identifying system according to claim 2, wherein the curve fitting and geometrical element identifying module:

identifies that the dot muster is a line when the circle-offset is greater than the line-offset; and identifies that the dot muster is a circle when the circle-offset is less than or equal to the line-offset.

4. The identifying system according to claim 2, wherein the line-offset is a span length between a top borderline and a bottom borderline which are both fitted according to the coordinates of all the dots of the dot muster.

5. The identifying system according to claim 2, wherein the circle-offset is a span length between an inner border circle and an outer border circle which are both fitted according to the coordinates of all the dots of the dot muster.

6. A computer-enabled method for automatically identifying a geometrical element in an image, the method comprising the steps of:

retrieving the image from an object to be measured via an image capturing apparatus;

collecting dots from the image as a dot muster and retrieving coordinates of all dots of the dot muster from a coordinate system by using a collecting module that is included in a computer;

identifying that the dot muster is a dot by using a curve fitting and geometrical element identifying module that is included in the computer, when only one dot is included in the dot muster;

identifying that the dot muster is a line by using the curve fitting and geometrical element identifying module, when two dots are included in the dot muster;

calculating a line-offset and a circle-offset respectively for the dot muster according to the coordinates of all the dots of the dot muster by using the curve fitting and geometrical element identifying module, when three dots or more are included in the dot muster;

identifying that the dot muster is a line by using the curve fitting and geometrical element identifying module, when the circle-offset is greater than or equal to the line-offset; and identifying that the dot muster is a circle by using the curve fitting and geometrical element identifying module, when the circle-offset is less than the line-offset.

7. The method according to claim 6, wherein the step of calculating the line-offset comprises the steps of:

fitting a top borderline and a bottom borderline according to the coordinates of all the dots of the dot muster; and calculating a span length between the top borderline and the bottom borderline as the line-offset.

8. The method according to claim 6, wherein the step of calculating the circle-offset comprises the steps of:

fitting an inner border circle and an outer border circle according to the coordinates of all the dots of the dot muster; and calculating a span length between the inner border circle and the outer border circle as the circle-offset.

9. The method according to claim 6, further comprising the step of: outputting the identifying result.

10. A computer-enabled method for automatically identifying a geometrical element in an image, the method comprising the steps of:

retrieving the image from an object to be measured via an image capturing apparatus;

collecting dots from the image as a dot muster and retrieving coordinates of all dots of the dot muster from a coordinate system by using a collecting module that is included in a computer;

identifying that the dot muster is a dot by using a curve fitting and geometrical element identifying module that is included in the computer, when only one dot is included in the dot muster;

identifying that the dot muster is a line by using the curve fitting and geometrical element identifying module, when two dots are included in the dot muster;

calculating a line-offset and a circle-offset respectively for the dot muster according to the coordinates of all the dots of the dot muster by using the curve fitting and geometrical element identifying module, when three dots or more are included in the dot muster;

identifying that the dot muster is a line by using the curve fitting and geometrical element identifying module, when the circle-offset is greater than the line-offset; and identifying that the dot muster is a circle by using the curve fitting and geometrical element identifying module, when the circle-offset is less than or equal to the line-offset.

11. The method according to claim 10, wherein the step of calculating the line-offset comprises the steps of:

fitting a top borderline and a bottom borderline according to the coordinates of all the dots of the dot muster; and calculating a span length between the top borderline and the bottom borderline as the line-offset.

12. The method according to claim 10, wherein the step of calculating the circle-offset comprises the steps of:

fitting an inner border circle and an outer border circle according to the coordinates of all the dots of the dot muster; and calculating a span length between the inner border circle and the outer border circle as the circle-offset.

13. The method according to claim 10, further comprising the step of: outputting the identifying result.

* * * * *